United States Patent [19]

Carpino et al.

[11] Patent Number: 4,623,484
[45] Date of Patent: Nov. 18, 1986

[54] PROCESS FOR PEPTIDE SYNTHESIS

[75] Inventors: Louis A. Carpino, Amherst, Mass.; Beri Cohen, Tarrytown, N.Y.

[73] Assignee: Research Corporation, New York, N.Y.

[21] Appl. No.: 805,483

[22] Filed: Dec. 5, 1985

Related U.S. Application Data

[62] Division of Ser. No. 614,344, May 24, 1984, Pat. No. 4,575,541.

[51] Int. Cl.⁴ .......................... C07K 1/04; C07K 1/00; C07K 7/44
[52] U.S. Cl. .................... 525/54.11; 530/334
[58] Field of Search ................. 260/112.5 R, 112.5 E

[56] References Cited

U.S. PATENT DOCUMENTS 3,457,243 7/1969 Blatz ................................. 525/353

Primary Examiner—Christopher A. Henderson

Attorney, Agent, or Firm—Scully, Scott Murphy & Presser

[57] ABSTRACT

This invention relates to polymers of the formula

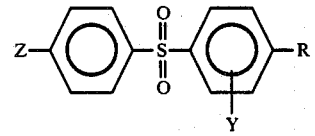

wherein
Z is polystyrene, or a copolymer comprising styrene and a comonomer or comonomers.
Y is selected from the group comprising nitro, acyl, carboxyl, formyl, cyano, carbalkoxy, sulfone, carboxyamide, or halogen; and
R is hydroxy, aryloxy, alkoxy, halogen, formyloxy, acyloxy, cyano, amino, substituted amino, carboxyamine, thiol, alkylthio, arylthio, aralkylthio or acylthio, useful in peptide synthesis.

3 Claims, No Drawings

PROCESS FOR PEPTIDE SYNTHESIS

This is a divisional of application Ser. No. 614,344, filed on May 24, 1984 now U.S. Pat. No. 4,575,541.

FIELD OF THE INVENTION

The present invention relates to new reagents useful in organic synthesis, and more specifically, useful in peptide synthesis.

This work has been supported in part by the National Institutes of Health.

BACKGROUND OF THE INVENTION

In spite of the recent surge in genetic engineering research, there is still a widespread use of traditional chemical methods of peptide synthesis. Although genetic methods may be far more efficient for the production of certain large peptides such as insulin or growth hormone, chemical synthesis is still more valuable in the manufacture of smaller peptides (less than 50 amino acids) and their analogues, which may contain D-amino acids or other substituents which do not occur naturally.

One popular method of chemical synthesis is the Merrifield method of solid phase peptide synthesis (*J. Am. Chem. Soc.*, 85:2149, 1963; *Biochemistry*, 3:1385, 1965) which involves the reaction of a protected amino acid in the presence of triethylamine with a polymeric support or substrate. U.S. Pat. No. 3,925,267 teaches a styrene-derived polymer useful as a substrate in the controlled synthesis of polypeptides. Specifically, this invention requires the chloromethylation of the aromatic rings to activate the polymer used as a carrier. U.S Pat. Nos. 4,079,021 and 4,133,942 are also directed to styrene-derived polymers which must be chloromethylated in order to react with the first amino acid. U.S. Pat. No. 3,948,821 also describes a chloromethylation procedure for polymer activation, in which the major modification is the addition of non-reactive polar solvents to eliminate the competing reaction between the chloromethylated resin and the solvent ethanol, which slows down the initial rate of esterification. It is also known to modify polystyrene to produce various polymeric reagents (Pepper, et al., *J. Chem. Soc.*, 4097 1953); displacement of the chlorine atom by a nucleophile may give rise to a variety of different reagents. Carboxylic acids have been linked to chloromethylated polystyrene through an ester bond to produce peptides (Merrifield, et al., *J. Am. Chem. Soc.*, 85, 2149). The disadvantage associated with this type of reaction, however, is that the weak carbon-oxygen bond of the ester linkage requires avoiding the use of strong bases and nucleophiles.

Many of the inherent disadvantages involved in the solid phase method of synthesis, such as difficulty in isolation of the peptide and possible contaminating side reactions, are avoided by the use of polymeric reagents rather than polymeric supports. Israeli Patent Application No. 59689 discloses a polymeric reagent prepared by Friedel Crafts acylation of polystyrene with substituted benzoic acids. The present invention relates to a polymeric reagent prepared by the sulfonylation of polystyrene by the addition of a substituted benzene sulfonyl group to the phenyl group of the polymer backbone. The polymeric reagent so produced shows a surprising reactivity and is particularly useful in the process of peptide synthesis.

BRIEF DESCRIPTION OF THE INVENTION

The present invention relates to polymeric reagents of the formula

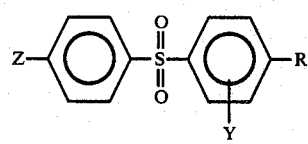

wherein
Z is the polymeric backbone of a compound which is polystyrene, or a copolymer comprising styrene and a comonomer or comonomers.

Y is selected from the group comprising nitro, acyl, carboxyl, formyl, cyano, carbalkoxy, sulfone, carboxyamide, or halogen; and R is hydroxy, aryloxy, alkoxy, halogen, formyloxy, acyloxy, cyano, amino, substituted amino, carboxyamine, thiol, alkylthio, arylthio, aralkylthio or acylthio.

It further relates to a process for their preparation and to their use in organic synthesis, particularly in peptide synthesis.

DETAILED DESCRIPTION OF THE INVENTION

The novel reagents of the present invention may be prepared by the reaction of compounds of the formulas

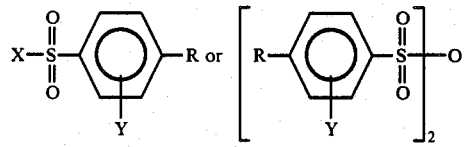

wherein X is halogen or OH, and Y and R are as hereinbefore described, with a polystyrene polymer or a copolymer comprising styrene, in a Friedel Crafts reaction.

The preferred compounds of the present invention are those in which Y is either nitro, acyl, sulfone, cyano or carboxyl, and the polymer is either polystyrene or a polymer comprising polystyrene and divinyl benzene. A particularly preferred compound is 3-nitro-4-hydroxy benzosulfonated polystryene.

The following schematic illustration represents a general method of synthesis.

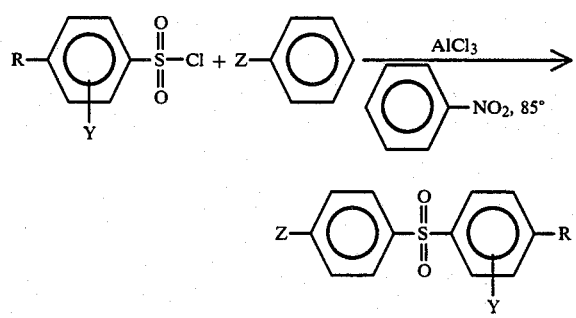

The polymers so produced have the advantage of being prepared in a minimum number of steps, with a reaction which does not alter the polymeric backbone, but further activates the resulting polymer. Any unreacted starting material and soluble by-products are easily washed off the polymer product. Further, the mechanical and swelling properties of these novel polymers are excellent: The polymers are relatively unbrittle and do not crumble easily. They also swell readily with a variety of different solvents or solvent mixtures, such as chloroform, methylene chloride, toluene and dioxane, and may be used under a variety of different temperatures, with no resulting change to the polymer. When a reaction is complete, the polymer can be quickly filtered and washed.

An advantage of the present preparation is that the sulfonyl function is added to the substituents of the benzene ring, thereby favorably affecting the reactivity of the substituents para to the sulfonyl. Thus, the hydrolysis of the resulting polymers cannot be carried out with the usual ether cleaving acidic substances such as HBr, HI or $ISi(CH)_3$. However, hydrolysis may be effected under basic conditions, including KOH in dioxane-water mixtures or tetraalkylammonium hydroxides in dioxane-water solutions. The following is a schematic representation of such a reaction:

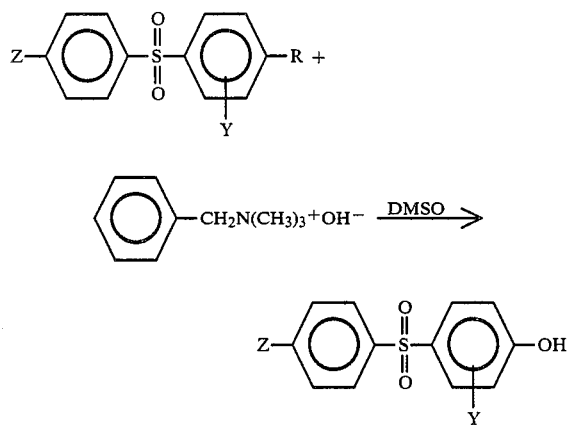

The derivatized polymers react with various acids to yield the corresponding active esters in a variety of conditions, for example, as below, with carboxylic acids:

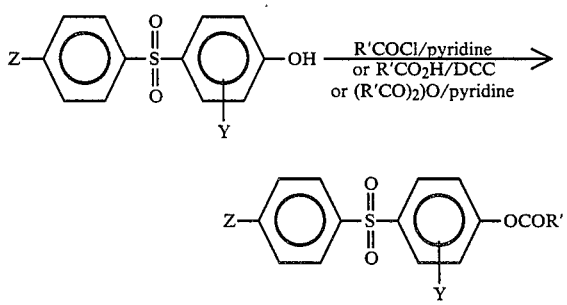

Esters of the following acids may be prepared: carboxylic acids, N-blocked amino acids, phosphoric acids, sulfonic acids, carbonic acids. The active esters may be used for effecting acylations such as N-acylations, C-acylations O-acylations and S-acylations, when reacted with amines (including amino acids and peptides), carbanions and enolates, alcohols or thiols, respectively.

Active esters of the polymers of the present invention show increased reactivity toward nucleophilic reagents as a result of the presence of the sulfonyl function. Thus, esters of the subject polymers are at least 200-250 times more active than the corresponding esters of 4-hydroxy-3-nitrobenzylated polystyrene (Kalir, et al., *Europ. J. Biochem.*, 42, 151), which has a methylene linkage to the polystyrene backbone. This linkage has no activating effect on the substituents at the position para to the linking group. Thus, peptide bond formation between amino acids or peptides having a free amino function and another amino acid in the form of a polymeric active ester of a polymer of the present invention, may be accomplished in minutes rather than hours with the appropriate active esters of 4-hydroxy-3-nitrobenzylated polystyrene.

The active esters of the subject polymers are also superior to active esters of another polymeric alcohol, polymeric 1-hydroxybenzotriazole (Kalir, et al. *Europ. J. Biochem.*, 59, 55), whose reaction rates with assorted nucleophiles are not unlike those of the subject polymers. Hydroxybenzotriazole esters are extremely sensitive toward moisture and alcohols, and must be used with dried and alcohol-free solvents. On the other hand, active esters of the subject polymers are insensitive to moisture and alcohols in neutral solution. Thus, during the coupling of an N-blocked amino acid to the polymer to form the active ester by the aid of dicyclohexylcarbodiimide (DCC), the nearly insoluble dicyclohexylurea formed is easily removable with isopropanol-methylene chloride solution, without any alcoholysis of the polymeric ester.

The subject polymers are also superior to those disclosed in Israeli Patent Application No. 59689 and Cohen, et al., *J. Org. Chem.*, 49:922 (1984), which have a carbonyl linkage to the polymer backbone. The latter polymers are quite reactive due to the activating effect of the carbonyl group or the substituents para to it. However, the hydroxyl groups of the derivatized benzosulfone polymers of the present invention are more acidic than those of the benzophenone polymers of the Israeli application. This is in large part due to the greater electron withdrawing effect of the sulfonyl group relative to a carbonyl. This exerts a stabilizing resonance effect on the corresponding polymeric phenolate ion, and thus renders the polymers of the present invention 5 to 10 times more reactive in a typical coupling procedure (see Example 4).

The polymer may be in any form suitable for the intended purpose: gel-type, macroreticular, isoporous, popcorn, bead-form or sheet. The exceptional physical stability of these new polymeric reagents allows them to be used repeatedly without undergoing any substantial changes in form. In contrast, many of the previously known polymeric reagents have a tendency to disintegrate and crumble to a powder. The novel reagents also constitute an effective and versatile means for effecting a wide range of organic reactions. The reagent may be filtered off at the end of the reaction, and the product may be easily separated. The reagents are also regenerated without difficulty and can be repeatedly used.

The present invention may be better understood with reference to the following non-limiting examples:

EXAMPLE 1

The following example illustrates the preparation of 4-methoxy-benzenesulfonylchloride:

108 grams of anisole (1.0 mol) was added to 700 ml of $CH_2Cl_2$ in a one-liter round bottom flask and cooled to 0°–5° C. While using ice-bath cooling to maintain the temperature below 10° C., 280 grams of chlorosulfonic acid (1.5 mol) was added dropwise with magnetic stirring over a 4 hour period. The solution was then carefully poured over ice (1500 grams) and the organic layer collected. The solution was washed in the cold 10% $NaHCO_3$, and the organic layer collected, then dried over $MgSO_4$ and filtered. The solvent was removed in a rotary evaporator under aspirator vacuum and crude 4-methoxy- benzenesulfonylchloride (72% yield) was obtained as a red oil in a sufficient state of purity to permit its use without further purification.

EXAMPLE 2

This example illustrates the preparation of 3-nitro-4-methoxy-benzenesulfonylchloride:

350 ml of fuming nitric acid (8.3 mol) was added very carefully in 25 ml aliquots to the crude product of Example 1 in a one-liter flask. To maintain control over the very vigorous reaction which immediately commenced, each portion of the nitric acid was allowed to react completely (i.e., until no fumes were evolved) before the next portion was added. When addition was complete, the solution was allowed to stand at room temperature for 30 minutes and then carefully poured over ice (1000 g). The resulting slurry was extracted with $CH_2Cl$ (3×250 ml) and the organic extracts were combined, dried over $MgSO_4$ and filtered. The solvent was removed in a rotary evaporator and the yellow crystals thus obtained were recrystallized from 50% $Et_2O$/hexane to yield pure 3-nitro-4-methoxy-benzenesulfonylchloride (161.3 g, 89% yield) as faintly yellow crystals.

EXAMPLE 3

This example illustrates the preparation of the benzosulfone polymer:

40 Grams of polystyrene beads (XE-305, Rohm and Haas) was washed with warm dioxane (5×300 ml) and filtered until a drop of filtrate spotted on a TLC plate no longer absorbed UV light. The beads were then washed with MeOH (2×300 ml), filtered and dried thoroughly under vacuum in a rotary evaporator using vigorous steam heating. The dried beads were finely mixed with 120 grams of 3-nitro-4-methoxybenzenesulfonylchloride (0.48 mol) in a one-liter round bottom flask. To this, a mixture of 68 grams of $AlCl_3$ (0.51 mol) in 240 ml of pure nitrobenzene was added. The flask was affixed with wire to a rotary evaporator to effect even mixing, and the mixture was rotated for 5 hours in an oil bath heated to 85° C. The mixture was then removed from the evaporator, filtered and the beads were poured into a solution of 150 ml of DMF, 100 ml of concentrated HCl and 150 grams of ice. The beads gradually lightened in color and after 45 minutes they were filtered and washed with a solution of 50% $DMF/H_2O$ until the washings were nearly colorless (about 5×300 ml). The beads were then washed with hot (110° C.) DMF (4×300 ml), then 70% $CH_2Cl_2$/MeOH (4×300 ml) and dried in the rotary evaporator.

To accomplish hydrolysis of the methoxy group, a solution of 130 ml of 40% benzyltrimethyl-ammonium-hydroxide in $H_2O$ ("Triton B"), 260 ml of DMSO and 130 ml of water was added to the flask and the mixture was rotated on the rotary evaporator, as described above, for 8 hours at 100° C. The polymer was then filtered and the process repeated for 8 more hours using fresh Triton $B/DMSO/H_2O$. The beads were then filtered and washed with copious amounts of warm water in 300 ml portions (about 40). The polymer was washed in warm dioxane (3×300 ml), filtered and then stirred in a solution of 40 ml of HOAc and 260 ml of dioxane for 15 minutes. Washings with dioxane were then performed until the washings were neutral and the polymer was then washed in 70% $CH_2Cl_2$/MeOH (6×300 ml). The beads were filtered and dried thoroughly under vacuum using steam heat. The derivatized polymer now weighed 61.5 grams, indicating the addition of 21.5 grams (106.4 mmol) 3-nitro-4-hydroxybenzosulfone function.

EXAMPLE 4

This example illustrates the formation of an active ester of 3-nitro-4-hydroxybenzosulfonylated polystyrene and its use in peptide synthesis.

Phenylalanine, protected with the amino protecting group chloroindenylmethoxycarbonyl (Climoc; see U.S. Pat. No. 4,304,519, incorporated herein by reference), in the amount of 3.7 grams (10 mmol) was dissolved in 35 ml of dry THF and 5 grams of 3-nitro-4-hydroxybenzosulfonylated polystyrene was added. The mixture was cooled to 0° C., 2 grams of N-benzyl-N-butylcarbodiimide (10 mol) was added, and the mixture was stirred for 3 hours at 0° C. The polymer was washed with chilled (0° C.) THF (4×50 ml), $CH_2Cl_2$ (3×50 ml) and then with 50 ml of $Et_2O$. Thus obtained was the polymeric "active" ester of ClimocPhe, containing 0.88 mmol ClimocPhe residues per gram of polymer. 4.45 grams of the polymeric ClimocPhe ester (3.92 mmol) was placed in a flask with 30 ml of $CH_2Cl_2$ and 0.26 grams of L-LeuOMe (1.77 mmol) was added. The mixture was stirred for 30 minutes, filtered and then washed with portions of $CH_2Cl_2$ (5×25 ml). The combined washings were evaporated to yield 0.99 g of ClimocPheLeuOMe. The identity of the compound was verified by TLC comparison with an authentic sample.

EXAMPLE 5

A general procedure for the preparation of a peptide by the use of active esters of the polymers of the present invention is as follows:

1 equivalent of a peptide or amino acid having a C-terminal blocking group is introduced as the amine hydrochloride or trifluoroacetate to a suspension of 40% molar excess of the polymeric active ester of an N-BOC amino acid to be coupled with the polymer in chloroform. 2 equivalents of triethylamine are added and the mixture shaken for 15–60 minutes, depending on the length of the peptide. The polymer is washed with chloroform; the chloroform solution is then washed with water and with a cold solution of 10% $NaHSO_4$, and evaporated to yield the pure N-BOC peptide. The N-BOC protecting group is removed by TFA in the usual manner and then the peptide is subjected to a new coupling cycle. Following this procedure, the blocked enkephaline BOC-Tyr(OBzl)-Gly-Gly-Phe-Leu-OBzl may be prepared in an overall 90% or better yield:

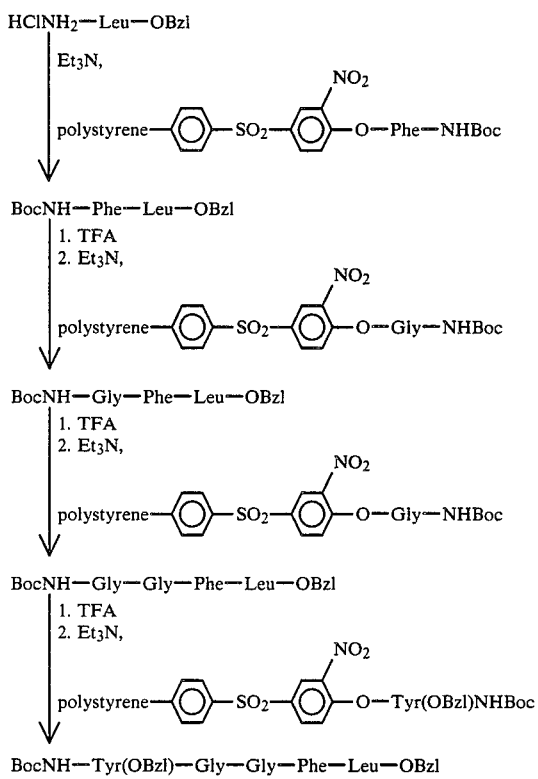

By substitution of Climoc-protection for BOC-protection in the above scheme, with a silica based deblocking agent in place of TFA, acid deblocking conditions can be avoided. A similar reaction has already been described in U.S. Pat. No 4,304,519.

The procedure may be repeated up to 3 to 5 times utilizing the same polymer, with only a filtering and a washing of the polymer between successive procedures. The resulting polymer is substantially without change in its form or reactivity after repeated usage.

What is claimed is:

1. In a process for producing peptides by reacting a protected amino acid with an activated polymeric support or substrate, the improvement comprising employing as said polymeric support or substrate compounds of the formula

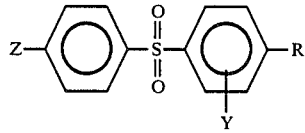

wherein
  Z is polystyrene, or a copolymer comprising styrene and a divinyl benzene comonomer.
  Y is selected from the group comprising nitro, acyl, carboxyl, formyl, cyano, carbalkoxy, aryl sulfone, alkyl sulfone, carboxyamide, or halogen; and
  R is hydroxy, aryloxy, alkoxy, halogen, formyloxy, acyloxy, cyano, amino acylamino, alkylamino, carboxyamine, thiol, alkylthio, arylthio, aralkylthio or acylthio.

2. The process of claim 1 wherein Y is nitro, acyl or carboxy.

3. The process of claim 1 wherein the compound is 3-nitro-4-hydroxybenzosulfonated polystryene.

* * * * *